(12) United States Patent
Berger et al.

(10) Patent No.: US 11,244,019 B2
(45) Date of Patent: Feb. 8, 2022

(54) ENRICHMENT OF USER SPECIFIC INFORMATION

(71) Applicants: Andreas Berger, Palo Alto, CA (US); Hans-Martin Hellebrand, Menlo Park, CA (US)

(72) Inventors: Andreas Berger, Palo Alto, CA (US); Hans-Martin Hellebrand, Menlo Park, CA (US)

(73) Assignee: Humada Holdings Inc., Palo Alto, CA (US)

( * ) Notice: Subject to any disclaimer, the term of this patent is extended or adjusted under 35 U.S.C. 154(b) by 48 days.

(21) Appl. No.: 16/708,076

(22) Filed: Dec. 9, 2019

(65) Prior Publication Data
US 2020/0142937 A1 May 7, 2020

Related U.S. Application Data

(63) Continuation of application No. PCT/US2018/036457, filed on Jun. 7, 2018.
(Continued)

(51) Int. Cl.
*G06F 7/02* (2006.01)
*G06F 16/00* (2019.01)
(Continued)

(52) U.S. Cl.
CPC ........ *G06F 16/9535* (2019.01); *G06F 16/335* (2019.01); *G06F 16/951* (2019.01); *G06F 16/9538* (2019.01)

(58) Field of Classification Search
CPC ............... G06F 16/9535; G06F 16/951; G06F 16/9538; G06F 16/335
See application file for complete search history.

(56) References Cited

U.S. PATENT DOCUMENTS

| | | | | |
|---|---|---|---|---|
| 10,523,643 | B1 * | 12/2019 | Davis | ...................... H04L 63/20 |
| 2010/0205652 | A1 * | 8/2010 | Bouchard | .......... G06Q 30/0255 |
| | | | | 726/3 |

(Continued)

OTHER PUBLICATIONS

Ehab Elgindy et al., "Enriching User Profiles Using Geo-Social Place Semantics in Geo-Folksonomies", International Journal of Geographic Information Science, vol. 28, No. 7, Apr. 1, 2014, pp. 1439-1458, 21 pages.
(Continued)

*Primary Examiner* — Bruce M Moser
(74) *Attorney, Agent, or Firm* — Reinhart Boerner Van Deuren P.C.

(57) ABSTRACT

A method is disclosed in which information based at least partially on a search query information being associated with a user and/or a group of users is obtained. Personal information associated with the user and/or the group of users is extracted from the obtained information. At least one user profile is created based at least partially on the extracted personal information. One or more pieces of attribute information are determined for enriching the personal information of the created user profile. Further, the determined one or more pieces of attribute information are allocated to the user profile and/or to personal information included in the user profile. It is further disclosed an according apparatus, computer program and system.

18 Claims, 7 Drawing Sheets

Related U.S. Application Data

(60) Provisional application No. 62/517,657, filed on Jun. 9, 2017.

(51) Int. Cl.
| | | |
|---|---|---|
| *G06F 16/9535* | (2019.01) |
| *G06F 16/951* | (2019.01) |
| *G06F 16/9538* | (2019.01) |
| *G06F 16/335* | (2019.01) |

(56) References Cited

U.S. PATENT DOCUMENTS

| | | |
|---|---|---|
| 2013/0238686 A1 | 9/2013 | O'Donoghue et al. |
| 2014/0007017 A1 | 1/2014 | Sternfeld et al. |
| 2014/0156806 A1 | 6/2014 | Karpistsenko et al. |
| 2018/0285463 A1* | 10/2018 | Choi .................. G06F 16/9535 |
| 2020/0097679 A1* | 3/2020 | Fisse .................. G06F 21/6254 |

OTHER PUBLICATIONS

Susan Gauch et al., "User Profiles for Personalized Information Access", The Adaptive Web, Springer Berlin Heidelberg, ISBN: 978-3-540-72078-2, 2007, pp. 54-89, 36 pages.

* cited by examiner

ENRICHMENT OF USER SPECIFIC INFORMATION

CROSS-REFERENCE TO RELATED PATENT APPLICATIONS

This patent application is a continuation of PCT Application No. PCT/US2018/036457, filed Jun. 7, 2018, which claims the benefit of U.S. Provisional Patent Application No. 62/517,657, filed Jun. 9, 2017, the entire teachings and disclosure of which are incorporated herein by reference thereto.

FIELD

The following disclosure relates to the field of user specific information for usage in services, or more particularly for usage in services that are personalized for a user. The disclosure relates to systems, apparatuses, and methods for obtaining user specific information for one or more services.

BACKGROUND

Digital services are harvesting large amount of information about users. Almost every service used by one or more users result in information around the individual that is stored independently by the service provider, e.g. organizations or companies offering services. The services provided can reach from online retailers to search engine providers and so on. The service providers use the stored information around a user or a group of users to provide tailored respectively personalized services (e.g. personalized advertising), to the user. In particular, providing personalized services enhances the probability of converting a user into a regular user.

Information about users stored at each service provider is typically not shared between different service providers, because the provided services are not linked. The user cannot or only in a very limited amount orchestrate or link different services to enhance his user experience based on information harvested about him.

SUMMARY

Personalized services require an accurate identification of the user so that information linked to the user can be used for providing personalized services. Personalized services can further be provided more accurately adapted to the user in case the personal information represent as complete a picture of the user as possible.

It is thus, inter alia, an object of the invention to provide enhanced personal information about a user based on obtained information, to enable enhanced personalized services.

According to a first exemplary embodiment of the present invention, a method is disclosed, the method comprising:
  obtaining information based at least partially on a search query information being associated with a user and/or a group of users;
  extracting personal information associated with the user and/or the group of users from the obtained information;
  creating at least one user profile based at least partially on the extracted personal information;
  determining one or more pieces of attribute information for enriching the personal information of the created user profile; and
  allocating the determined one or more pieces of attribute information to the user profile and/or to personal information comprised by the user profile.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile terminal. For instance, the method may be performed and/or controlled by using at least one processor of the electronic device.

According to a further exemplary aspect of the invention, a computer program is disclosed, the computer program when executed by a processor causing an apparatus, for instance a server, to perform and/or control the actions of the method according to the first exemplary embodiment.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary embodiment.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary embodiment.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a further exemplary aspect of the invention, a system is disclosed, comprising:

one or more apparatuses according to any aspect of the invention as disclosed above, wherein the one or more apparatuses are configured to perform and/or control the method according to the first aspect of the present invention.

In the following, exemplary features and exemplary embodiments of all aspects of the present invention will be described in further detail.

The obtained information may for instance comprise one or more pieces of information.

The obtained information may for instance be indicative of user specific information associated with the user and/or the group of users of the query information. The user may for instance be an individual. In contrast, the group of users may for instance be more than one individual. The group of users will be understood as at least two individuals, which do not need to be associated with a comparable or common attribute, but can be. Group of users further can be associated with a pre-defined comparable or common attribute, e.g. like a business (working for the same company, in the same technical field to name but a few non-limiting examples), or same device (independent from individual, e.g. smartphone, or smartphone of certain manufacturer, or type of device e.g. notebooks to name but a few non-limiting examples), comparable or common attribute, e.g. same interest device (e.g. sports, music, to name but a few non-limiting examples).

Personal information may for instance be indicative of specific content around and/or about the user and/or the group of users, which may for instance be comprised by the source from which the obtained information stems, and/or may for instance be associated with the source from which the obtained information stems.

The created user profile may for instance comprise the extracted personal information.

The one or more pieces of attribute information may for instance be determined at least partially based on obtained (e.g. gathered or comprised) attribute information of the source from which the extracted personal information out of the obtained information stems. It may be referred to this kind of determining of the one or more pieces of attribute information also as "determining directly one or more pieces of attribute information". Alternatively or additionally, the one or more pieces of attribute information may for instance be indirectly determined at least partially based on e.g. merged personal information of the user profile and a generated attribute information corresponding to new information obtained by the merging of already known personal information of the user profile.

The allocating of determined one or more attributes to the user profile and/or to one or more pieces of personal information comprised by the user profile may for instance be performed by associating the determined one or more attribute information to the user profile and/or to a specific piece of personal information comprised by the user profile. Further, the determined one or more pieces of attribute information may for instance be comprised by the created user profile.

In an exemplary embodiment according to all aspects of the present invention, one or more pieces of information may for instance be provided (e.g. transferred, and/or output) to another entity that is different from the apparatus performing and/or controlling the method, e.g. a server.

The one or more determined pieces of attribute information may for instance be stored within database as an optional step of the method since when enough computing power exits, user profile may for instance be created on-the-fly e.g. each time a request for a personalized service is obtained and transmitted from a third party service provider to e.g. the server hosting a service for enriched personalized information.

Obtained (e.g. found based on a performed search, e.g. in the Internet) information may for instance be digital information and/or analog information which are digitized prior to or during the obtaining. A source of obtained information may for instance be a third party service provider (e.g. a server having gathered and/or stored information), an electronic device which may gather and/or may have stored information (e.g. every terminal accessible by user), sensors of electronic device of user or sensors which may recognize a user, e.g. such as a public camera, microphones or the like to name but a few non-limiting examples.

Information about and/or associated with the user and/or the group of users may for instance be obtained from different sources. The different source may for instance be input-sources for obtaining the information about the user or the group of users according to an exemplary embodiment of the method of the first aspect of the present invention. The source may for instance be an analog one, e.g. newspaper, book, public record, bulletin board or any other non-digital source that can or cannot be digitized to name but a few non-limiting examples. The source may for instance be a digital one, e.g. hardware device (e.g. Internet-of-Things (IoT), and/or Internet-of-Everything (IoE)) that have computing and/or storage and/or connectivity capacities, which may create, store and/or collect information, which may for instance be pushed into a public accessible storage (e.g. a cloud storage, to name but one non-limiting example). Further, the source may for instance be audio and/or video information and/or live-streaming video and/or location information and/or live location information associated with the user or the group of users, which may for instance be obtained (e.g. received) from one or more devices and/or sensors, which have gathered said information. In case the information is obtained from an analog source, prior to or during the obtaining the analog information of the analog source may for instance be digitized, so that the digitized information is obtained.

Personal information may for instance be extracted (e.g. obtained e.g. from the Internet) e.g. from software partners that allow personal information harvested by them to be collected, stored and/or pushed into a storage for collecting the personal information.

One or more pieces of attribute information for enriching information of the user profile may for instance be determined by using machine learning for creating attributes to be associated with one or more information of the created user profile.

The created user profile may for instance be updated and/or changed for e.g. adding further attributes to existing ones and or keeping a created user profile up-to-date. Further, one or more user profiles e.g. for new individual(s) may for instance be created based at least partially on information obtained and being associated with another user or another group of users. This may for instance be performed automatically in order to have preferably user profiles of as many users and/or group of users as possible.

According to an exemplary embodiment of all aspects of the present invention, based at least partially on one or more results of the search query information a crawling for the personal information is performed.

Crawling may for instance be performed based at least partially on an initial query information. The query information may for instance be associated with the user or the group of users, for instance the name of the user, or certain details associated with the user or the group of users.

Crawling may for instance comprise searching the Internet for data (personal information) on the user and/or the group of users (e.g. individual(s)).

Crawling may for instance be performed based at least partially on a search term, wherein the at least one result of the search may for instance be used as input for the crawling. The crawling may for instance comprise crawling one or more sources, e.g. provided URLs, to identify any information provided which may include personal information from these one or more sources.

The one or more pieces of attribute information for enriching of the user profile may for instance be used for another search and/or crawling as an input to obtain additional information associated with the user or the group of users corresponding to the one or more attributes. Further pieces of personal information may for instance be extracted from said additional information and be used in particular for updating the user profile.

The obtained information of the crawling may for instance be stored, e.g. in a short term memory (e.g. a Random Access Memory (RAM)). Stored information may for instance be filtered to clean the information e.g. by removing irrelevant information and/or noise of the information, which is not associated with the user or the group of users.

In this way, a two-step search for personal information may be realized enhancing the quality of the personal information for the user profile, since the second step may for instance use personal information and/or attribute information already associated with the user and/or the group of users. Thus, a high quality of the personal information obtained and extracted can be achieved.

Crawling the Internet may for instance be based at least partially on results of a search based on query information, and e.g. selecting of relevant results e.g. by the user and/or the group of users (e.g. by entered user input) and/or at least partially automatically based on a pre-defined criteria or determined according to pre-defined rule criteria associated with the user and/or the group of users. In this way, the crawling can be highly adapted to information at least partially being associated with the user and/or the group of users, for which the user profile is created.

In this way, results can be hugely improved, thus more relevant information and/or attributes associated with respectively connected with the user and/or the group of users can be obtained.

According to an exemplary embodiment of all aspects of the present invention, the created user profile is assigned to the user and/or the group of users.

The user profile may for instance be assigned to a single individual, e.g. a user, and/or to the group of users, wherein the group of user may for instance have at least one attribute in common e.g. gender, age, interest (e.g. hobby), sport, location, ethnicity, language, to name but a few non-limiting examples.

Attributes associated with the user or the group of users may for instance be directly obtained from the source, or may for instance be indirectly obtained (e.g. generated) e.g. by merging, processing and/or analyzing personal information, which were obtained and/or resulted e.g. from the crawling. The attributes indirectly obtained do not have a source associated with them (e.g. do not stem from an explicit source), but were created based on the merging, processing and/or analyzing of the previously extracted personal information, which are extracted from the obtained information of an explicit source.

According to an exemplary embodiment of all aspects of the present invention, the extracted one or more pieces of personal information are stored in a database According to an exemplary embodiment of all aspects of the present invention, one or more pointers to a source comprising the obtained information are comprised by the user profile.

The one or more pointers to a source from which the personal information may for instance stem, may for instance be comprised by the user profile instead of storing the personal information and/or the user profile in a database. In this way, efficiency due to reduced storage requirement and reduced data traffic is enhanced.

Alternatively, some personal information may for instance be stored in the database, and for other personal information one or more pointers may be used. One or more pointers to personal information may for instance be stored in database. These one or more pointers require much less storage capacity than storing of the personal information to which the one or more pointers may point would require. Further, each time at least one piece of information about the user and/or the group of users of the user profile is requested, the method according to all aspects of the present invention may for instance be performed and e.g. a user profile is created and personal information of the user profile is enriched by determining one or more pieces of attribute information and allocating them over and over again. The advantage is that no personal information about user and/or the group of users is stored at any time, which is highly compliant to laws and regulations, e.g. GDPR (General Data Protection Regulation).

According to an exemplary embodiment of all aspects of the present invention, the method further comprises:
   determining relevant information about the user and/or the group of users comprised by the user profile based at least partially on pre-defined or determined according to pre-defined parameters rules.

Relevant information may for instance be separated from irrelevant information about respectively being associated with the user and/or the group of users.

According to an exemplary embodiment of all aspects of the present invention, in case the created user profile is associated with more than one user, the method further comprises:
   creating a user profile for each user of the more than one users, wherein the user profile is created based at least partially on the personal information associated with the user.

For each user a unique user profile is generated respective created comprising personal information e.g. associated with attributes (e.g. specifying kind of personal information, for instance advertiser may submit attributes they are interested in and corresponding personal information associated with the user and/or the group of users to which the advertiser wants to provide a personalized service may for instance be provided accordingly).

According to an exemplary embodiment of all aspects of the present invention, the method further comprises:
   determining a quality information and/or quality information of the source the personal information stems based at least partially on an evaluation of the source according to pre-defined rules.

The determining may for instance be based at least partially on a checking of whether or not obtained information, extracted personal information and/or determined one or more pieces of attribute information are of high quality and/or are of high quantity. For instance, in case the obtained information, extracted personal information and/or determined one or more pieces of attribute information stem from a reliable source, e.g. which is known to be reliable (e.g. government, universities, business websites to name but a few non-limiting examples), it may for instance be assumed that the obtained information, extracted personal information and/or determined one or more pieces of attribute information are of high quality. Further, in case the obtained information, extracted personal information and/or determined one or more pieces of attribute information are obtained redundantly from more than one source, it may for instance be assumed that the obtained information, extracted personal information and/or determined one or more pieces of attribute information are of high quantity, thus enhancing likelihood that the obtained information, extracted personal information and/or determined one or more pieces of attribute information are e.g. reliable.

According to an exemplary embodiment of all aspects of the present invention, one or more importance ranks are assigned to the determined one or more pieces of attribute information of the user profile.

Assigning importance ranks to one or more pieces of attribute information connected respectively associated with an individual or user or group of users may for instance be performed.

Importance ranks may for instance be indicative of one or more values allowing a ordering of the determined one or more attributes of the user profile.

According to an exemplary embodiment of all aspects of the present invention, the one or more importance ranks are generated based at least partially on the following steps:
  determining a first rating for one or more sources for each of the pieces of personal information of the user profile;
  determining a second rating for the one or more attributes of the user profile;
  determining the one or more importance ranks according to (i) authenticity, (ii) preciseness, and/or (iii) up-to-dateness of the personal information of the user profile based at least partially on the determined first rating and the determined second rating.

The determining of the first rating may for instance be depending on multiple variables like overall reliability of the source (e.g. phone directories, ID-Verification, email xyz.gov, email yahoo.com). The first rating may for instance be a rank (ordering of ratings to more reliable sources being positioned higher than less reliable sources).

The determining of the second rating may for instance de depending upon the ranking of the source or sum of sources of the preceding step.

The one or more importance ranks according to (i) authenticity, (ii) preciseness, and/or (iii) up-to-dateness of the personal information of the user profile is determined based at least partially on the determined first rating and the determined second rating.

In this way, a multisided, holistic human-centric ranking is provided, wherein all accessible or available attributes are ranked in relation to the source and the ranking of the source. This may for instance further allow an overall ranking of the unique identified individual (user and/or group of users). Further, it is possible to compare a relation of different unique identified individuals is possible, e.g. comparing an individual to a pre-defined group of users.

One or more ranks may for instance be calculated based at least partially on e.g. recursive real-time insights of (all) obtained information of the sources, wherein the one or more ranks may for instance represent probabilities for certain outcomes.

The rank of one or more sources and one or more attributes associated with information of the user profile may for instance enable a full ranking of the unique identified non-anonymous human-centric digital identity that may for instance enable multiple use cases.

In a first step to generate the ranking, the source may for instance be rated depending on multiple variables, for instance overall reliability of the source (e.g. phone directories, ID-Verification, @xyc.gov email addresses, and/or @yahoo.com email addresses to name but a few non-limiting examples), e.g. by a corresponding algorithm. After a first initial input, another variable is considered depending on an input provided, e.g. by the server providing the service, or by the electronic device(s) of the user(s). Further, initial ranking may for instance be performed repetitive to create an up-to-date ranking. For instance, changes associated with the source of the information, e.g. dropping of quantity or quality of the source may for instance be considered in case the initial ranking is performed repetitive. In this way, e.g. the algorithm performing the initial ranking may for instance adopt quickly to validate new attributes taking into consideration the learning of the rankings done before. This may for instance be performed by machine learning algorithm, e.g. artificial neural networks.

In a second step to generate the ranking, the attributes associated with the user or the group of users may for instance be ranked depending on the ranking of the source and/or the sum of sources ranked in the first step. For instance, since a first attribute may for instance be found in more than one source or in a plurality of sources, the ranking may for instance consider the source of the attribute, but the sum of all attributes of the more than one source or the plurality of sources as well. These values may for instance be put in relation to each other, e.g. ten times low quality source, each comprising the same attribute might increase the ranking compared to one time high quality source comprising the attribute. Another example of putting attributes in relation to each other may for instance be ten times low quality source, each comprising the same attribute may for instance be better ranked than one time high quality source comprising a different attribute. Thus, the attribute found only in one high quality source will be ranked lower than the attribute found in a plurality of low quality sources, since the attribute found in a plurality of sources may be more likely be associated with the user or the group of users.

The third step to generate the ranking may for instance allow to rank the one or more pieces of attribute information as "stand alone attribute information" associated with the user and/or the group of users for one or more of the following parameters: i) authenticity; ii) preciseness; iii) up-to-dateness of the information.

In this way, all accessible and/or available attributes associated with the user and/or the group of users may for instance be ranked in relation to the source (from which the information stems) and the ranking of the source, to allow an overall ranking for the user and/or the group of users. The overall ranking of a first user in relation to another overall ranking of a second user will allow a comprehensive ranking taking the attributes but also the reliability of the attributes based at least partially on the source into account.

According to an exemplary embodiment of all aspects of the present invention, the method further comprises:

determining a scoring based at least partially on the quality information and/or the quantity information of the source from which the personal information stems.

The scoring may for instance enable to build ranks of information of the user profile based at least partially on the information of the user profile (e.g. personal information, one or more pieces of attribute information) and the determined one or more ranks.

The scoring may for instance be a ranking of information comprised by the user profile and/or attributes associated with the user of the user profile.

The scoring may for instance allow a third party service provide to use the personal information and/or the one or more pieces of attribute information of the user profile, e.g. for providing personalized services, to evaluate identified users for certain purposes regardless of other information or in combination with other information or as addition to a ranking by other information. For the user and/or the group of users, this ranking will provide a picture of how it is received within the world by other individuals (may for instance be other user of user profiles) or third parties that are interested in business relations or any other type of relation. In this way, a user and/or a group of users may for instance be enabled to decide, not to participate and secure information harvested about him or associated with him, e.g. to add, adjust, and/or verify information, and/or to share or not to share certain information.

According to an exemplary embodiment of all aspects of the present invention, the method further comprises:
providing the one or more importance ranks of the user profile.

The one or more importance ranks of a user profile may for instance be out of a plurality of user profiles in case more than one user profile is generated.

The providing may for instance be performed by outputting the one or more importance ranks to third party service provider (e.g. a server of the third party service provider), which may have requested the provision of the one or more importance ranks.

According to an exemplary embodiment of all aspects of the present invention, one or more sources from which the personal information stem are blockable or verifiable. The one or more sources from which the personal information stem are blockable or verifiable to enhance enrichment efficiency.

According to an exemplary embodiment of all aspects of the present invention, based at least partially on a piece of delete information (e.g. entered by the user and/or the group of users and/or at least one user of the group of users) one or more of the following is deleted:
i) information at the source;
ii) personal information of the user profile (e.g. at a database (e.g. the database storing the user profile));
iii) allocated one or more attributes;
iv) other information obtained (e.g. gathered) and being associated with the user and/or the group of users.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present invention and shall be understood to complement and be read together with the description as provided in the above summary section of this specification.

Figure 1:
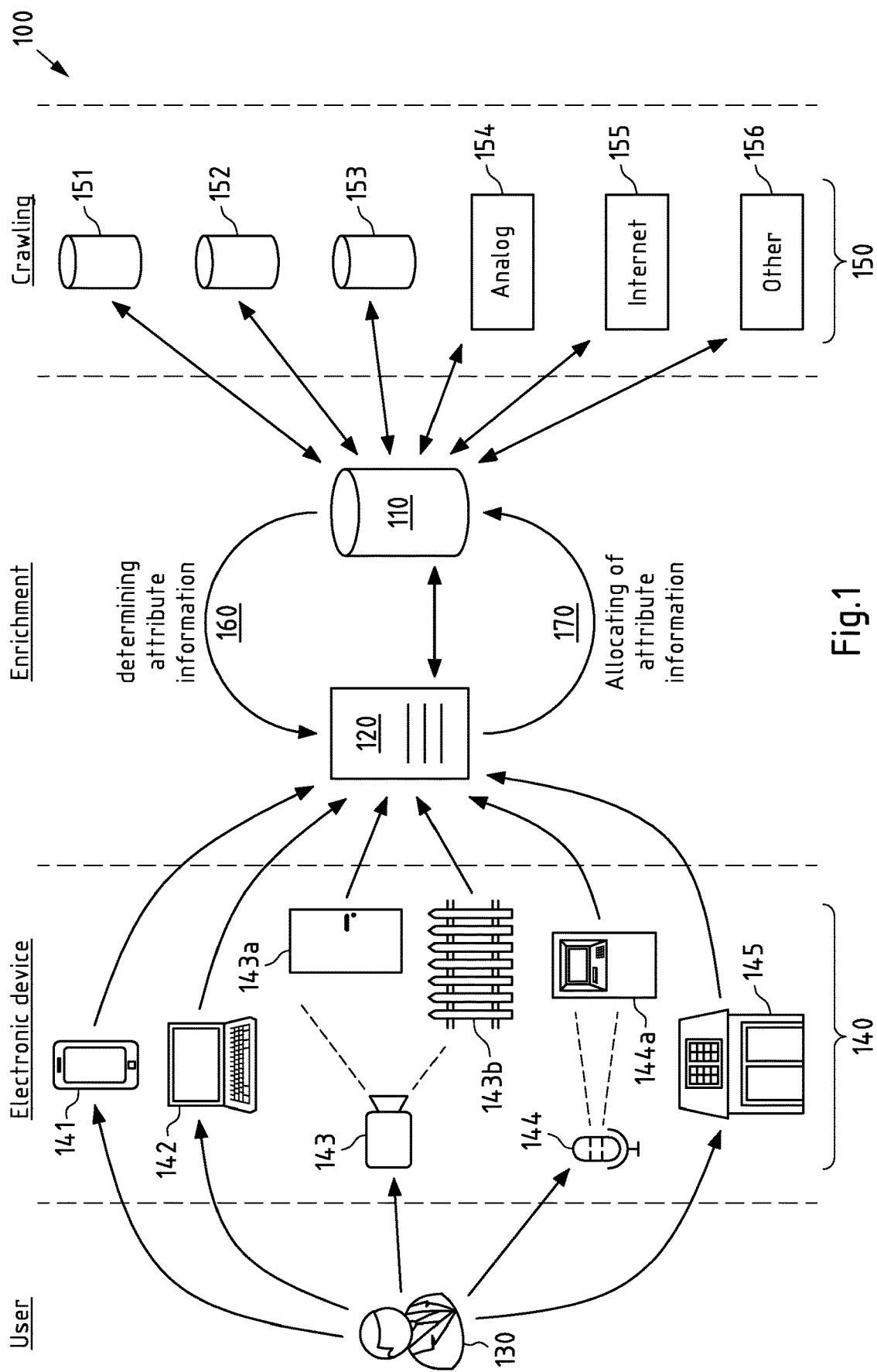
FIG. 1 shows a schematic block diagram of a system according to an exemplary aspect of the present invention.

FIG. 1 is a schematic block diagram of a system 100 according to an exemplary embodiment of the present invention. System 100 comprises a server 110, which may alternatively be embodied as a server cloud (e.g. a plurality of servers connected e.g. via the internet and providing services at least partially jointly). Server 110 may be connected to a database 120. System 100 further comprises a plurality of data silos 151 to 156 (e.g. each for instance embodied as a database 151 to 153). The data silos may for instance be connected to server 110, e.g. via the Internet and allowing access from the server 110 to data of the data silos 151 to 156. Further, system 100 comprises one or more electronic devices 141 to 145, of which different realizations are shown as non-limiting examples: a mobile device 141, a notebook 142, a camera 143, a microphone 144, and a digital store 145 (e.g. a server hosting an e-commerce store). The electronic devices 141 to 145, the server 110, the database 120 and the data silos 151 to 156 may for instance be connected to each other, e.g. via the Internet and allowing exchange of information.

According to an example embodiment, database 110 may for instance store one or more user profiles. Each of the user profiles may for instance be associated with a user, e.g. the user 130. Further, each of the user profiles may for instance comprise personal information, e.g. by one or more pointers pointing at one of the different data silos 151 to 156 comprising such information. The one or more pointers may for instance be stored in the database 120 as a part of the user profile. Further, each of the user profiles may for instance be associated with at least one user.

The electronic devices 141 to 145 may for instance be configured to gather one or more pieces of information associated with the user 130. The server 110 may for instance be configured to obtain (e.g. receive) one or more pieces of information of these electronic devices 141 to 145. The information of the electronic devices 141 to 145 may for instance be obtained by the server 110 based on a search query information, which may for instance be received from another server (not shown) of a third party service provider. In an exemplary embodiment, the server of the third party service provider may for instance be server 145 hosting the digital store, wherein the digital store may want to offer a personalized service, e.g. to the user 130. The server 145 may thus gather one or more pieces of information associated with the user to which it wants to provide a personalized service, and send a request e.g. comprising preferences in which kind of information the server 145 for offering a personalized service is interested in. Based on the request, the server 110 may for instance generate a corresponding search query information for obtaining information from the server 145, but also from further sources, e.g. one of the other electronic devices 141 to 144. From the obtained information, personal information are extracted, which are then used for creating a user profile comprising the extracted personal information. As indicated by the plurality of double arrows between the database 120 and the data silos 151 to 154, additional information associated with e.g. the user 130 may for instance be obtained from at least one of the data silos 151 to 156. Based on the information obtained and which are associated with the user, one or more pieces of attribute information are determined, illustrated by the arrows with the reference numeral 160. The determined one or more pieces of attribute information are allocated to the personal information of the user profile, illustrated by the arrow with the reference numeral 170.

In case of the exemplary embodiment, wherein server 145 hosting the digital store may have requested to be provided with one or more pieces of personal information associated with the user 130 for providing a personalized service to the user 130, based at least partially on the one or more pieces of attribute information allocated to the personal information of the user profile of the database 120, may for instance be provided to the server 145 hosting the digital store.

Server 110 may for instance be configured to establish a communication connection with the database 120, each of the data silos 151 to 156, and/or with each of the electronic device 141 to 145. Communication between the aforementioned entities may for instance take place at least partially in a wired function, e.g. based on Local Area Network (LAN), and/or Wide Area Network (WAN) communication. Additionally or alternatively, communication between the aforementioned entities may for instance take place at least partially wireless function, e.g. based on cellular radio communication or on Wireless Local Area Network (WLAN) based communication, to name but a few non-limiting examples.

Figure 2:
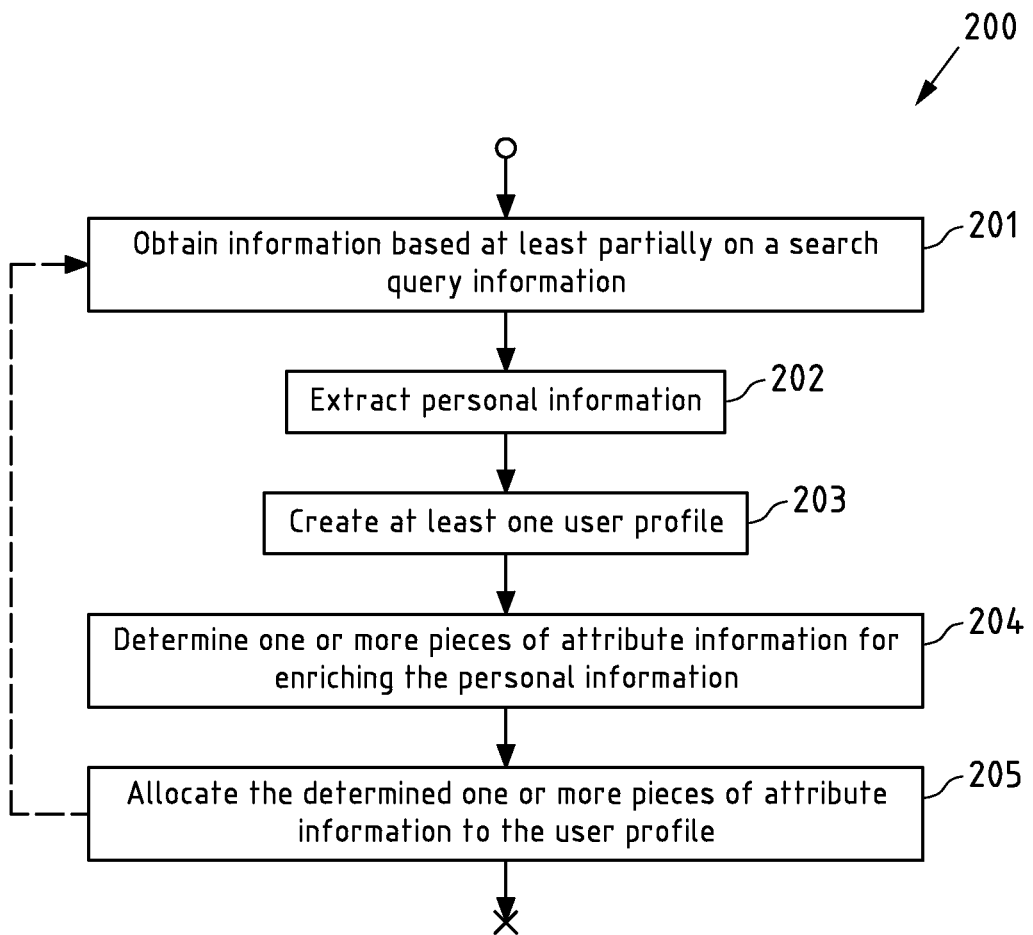
FIG. 2 shows a flowchart showing an example embodiment of a method according to the first exemplary aspect of the present invention.

FIG. 2 is a flowchart 200 showing an example embodiment of a method according to the first exemplary aspect of the present invention. This flowchart 200 may for instance be performed by server 110 of FIG. 1.

In a first step 201, one or more pieces of information are obtained based at least partially on a search query information being associated with a user and/or a group of users. The search query information may for instance be comprised by a request, which may for instance be received prior to performing the step 201 of the flowchart 200. The search query information may for instance comprise a piece of information associated with a user, for which e.g. publicly accessible information may for instance be obtained. The information may for instance be obtained from one or more sources, e.g. from at least one of the electronic devices 141 to 145 of FIG. 1. The obtained information may for instance comprise pieces of information being associated with the user (e.g. in case the search query information comprises the user) and further pieces of information which are not being associated with the user. The latter pieces of information may not be considered to be personal information of the user.

In a second step 202, personal information associated with the user and/or the group of users are extracted from the obtained information. The personal information may for instance be personal information comprised by the obtained information, as already described with respect to step 201.

In a third step 203, at least one user profile is created based at least partially on the extracted pieces of personal information. The user profile may for instance comprise the extracted pieces of personal information, wherein the extracted pieces of personal information may for instance be connected respectively linked to the user. The pieces of personal information may for instance be linked to the user in case the obtained information comprise an information allowing to identify the user and/or the search query information comprises an information allowing to identify the user to name but a few non-limiting examples.

In a fourth step 204, one or more pieces of attribute information are determined for enriching the personal information of the created user profile. The one or more pieces of attribute information may for instance be determined based on attributes connected to the user (e.g. which can be determined e.g. by analyzing the extracted personal information), and e.g. by additional pieces of information that may be obtained by using already allocated one or more pieces of attribute information of the user profile as input according to another search query information. Further, personal information of a source may be accompanied by e.g. meta data, which may for instance be used for determining an attribute information associated with the user. In this way, the user profile respectively the information comprised by the user profile are enriched. The analyzing may for instance be performed based at least partially on a contextual frame, which may for instance be performed by artificial neural networks enabling a contextual analysis of information, e.g. based on training cases to name but one non-limiting example.

In a fifth step 205, the determined one or more pieces of attribute information are allocated to the user profile and/or to personal information comprised by the user profile. For instance, the allocating may be performed by linking, connecting, and/or associating the determined one or more pieces of attribute information to the corresponding piece of information of the user profile.

Further, based on allocated one or more pieces of attribute information, additional information may for instance be obtained, and the steps of the flowchart 200 may for instance be repeated for enhancing, and/or specifying, and/or adding additional information to the created user profile (see also description with respect to step 204 of FIG. 2).

Figure 3:
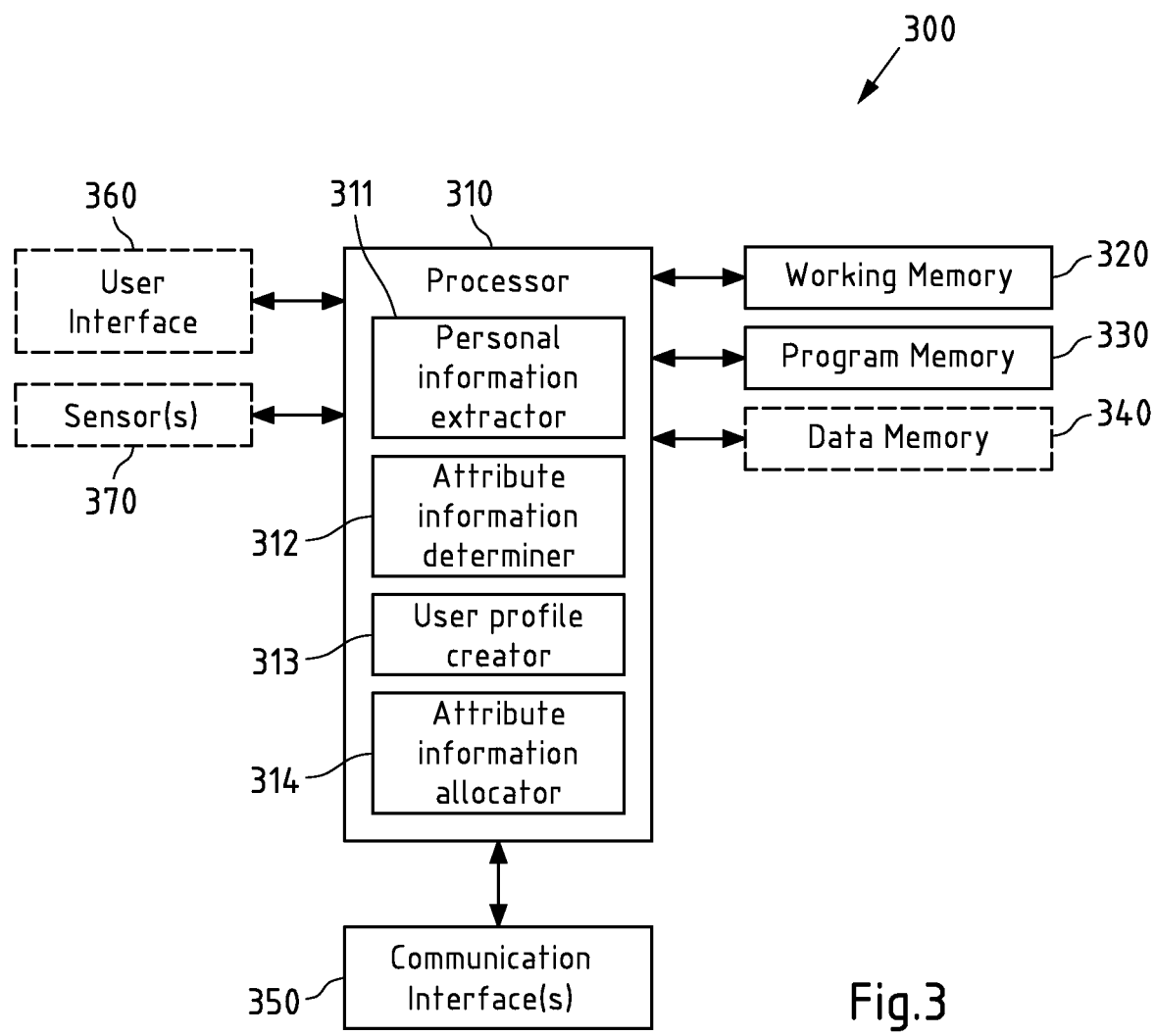
FIG. 3 shows a schematic block diagram of an apparatus according to an exemplary aspect of the present invention.

FIG. 3 is a schematic block diagram of an apparatus 300 according to an exemplary aspect of the present invention, which may for instance represent server 110 of FIG. 1.

Apparatus 300 comprises a processor 310, working memory 320, program memory 330, optional data memory 340, communication interface(s) 350, an optional user interface 360 and an optional sensor(s) 370.

Apparatus 300 may for instance be configured to perform and/or control or comprise respective means (at least one of 310 to 370) for performing and/or controlling the method according to the first exemplary aspect. Apparatus 300 may as well constitute an apparatus comprising at least one processor (310) and at least one memory (320) including computer program code, the at least one memory and the computer program code configured to, with the at least one processor, cause an apparatus, e.g. apparatus 300 at least to perform and/or control the method according to exemplary aspects of the invention.

Processor 310 may for instance comprise a personal information extractor 311, an attribute information determiner 312, a user profile creator 313, an attribute information allocator 314, or a combination thereof as a functional and/or structural unit Personal information extractor 311 may for instance be configured to extract personal information from obtained information (see step 202 of FIG. 2). Attribute information determiner 312 may for instance be configured to determine one or more pieces of attribute information for enriching the personal information and/or the user profile (see step 204 of FIG. 2). User profile creator 313 may for instance be configured to create at least one user profile (see step 203 of FIG. 2). Attribute information allocator 314 may for instance be configured to allocate one or more pieces of attribute information to the user profile (see step 205 of FIG. 2). Processor 310 may for instance further control the memories 320 to 340, the communication interface(s) 350, the optional user interface 360 and the optional sensor(s) 370.

Processor 310 may for instance execute computer program code stored in program memory 330, which may for instance represent a computer readable storage medium comprising program code that, when executed by processor 310, causes the processor 310 to perform the method according to the first exemplary aspect.

Processor 310 (and also any other processor mentioned in this specification) may be a processor of any suitable type. Processor 310 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 310 may for instance be an application processor that runs an operating system.

Program memory 330 may also be included into processor 310. This memory may for instance be fixedly connected to processor 310, or be at least partially removable from processor 310, for instance in the form of a memory card or stick. Program memory 330 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 330 may also comprise an operating system for processor 310. Program memory 330 may also comprise a firmware for apparatus 300.

Apparatus 300 comprises a working memory 320, for instance in the form of a volatile memory. It may for instance be a Random Access Memory (RAM) or Dynamic RAM (DRAM), to give but a few non-limiting examples. It may for instance be used by processor 310 when executing an operating system and/or computer program.

Data memory 340 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 340 may for instance store user specific information.

Communication interface(s) 350 enable apparatus 300 to communicate with other entities, e.g. with server 110, server 140, data silos 121 to 124, electronic device 131 to 133 of FIG. 1. The communication interface(s) 350 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 300 to communicate with other entities, for instance server 110, data silos 151 to 156, electronic device 141 to 145 of FIG. 1.

User interface 360 is optional and may comprise a display for displaying information to a user and/or an input device (e.g. a keyboard, keypad, touchpad, mouse, etc.) for receiving information from a user.

Sensor(s) 370 are optional and may for instance comprise a GPS receiver, means for obtaining sound, means for obtaining a picture information, an accelerometer, a gyroscope, or a combination thereof to name but a few non-limiting examples, e.g. to obtain (e.g. gather) user information.

Some or all of the components of the apparatus 300 may for instance be connected via a bus. Some or all of the components of the apparatus 300 may for instance be combined into one or more modules.

Figure 4:
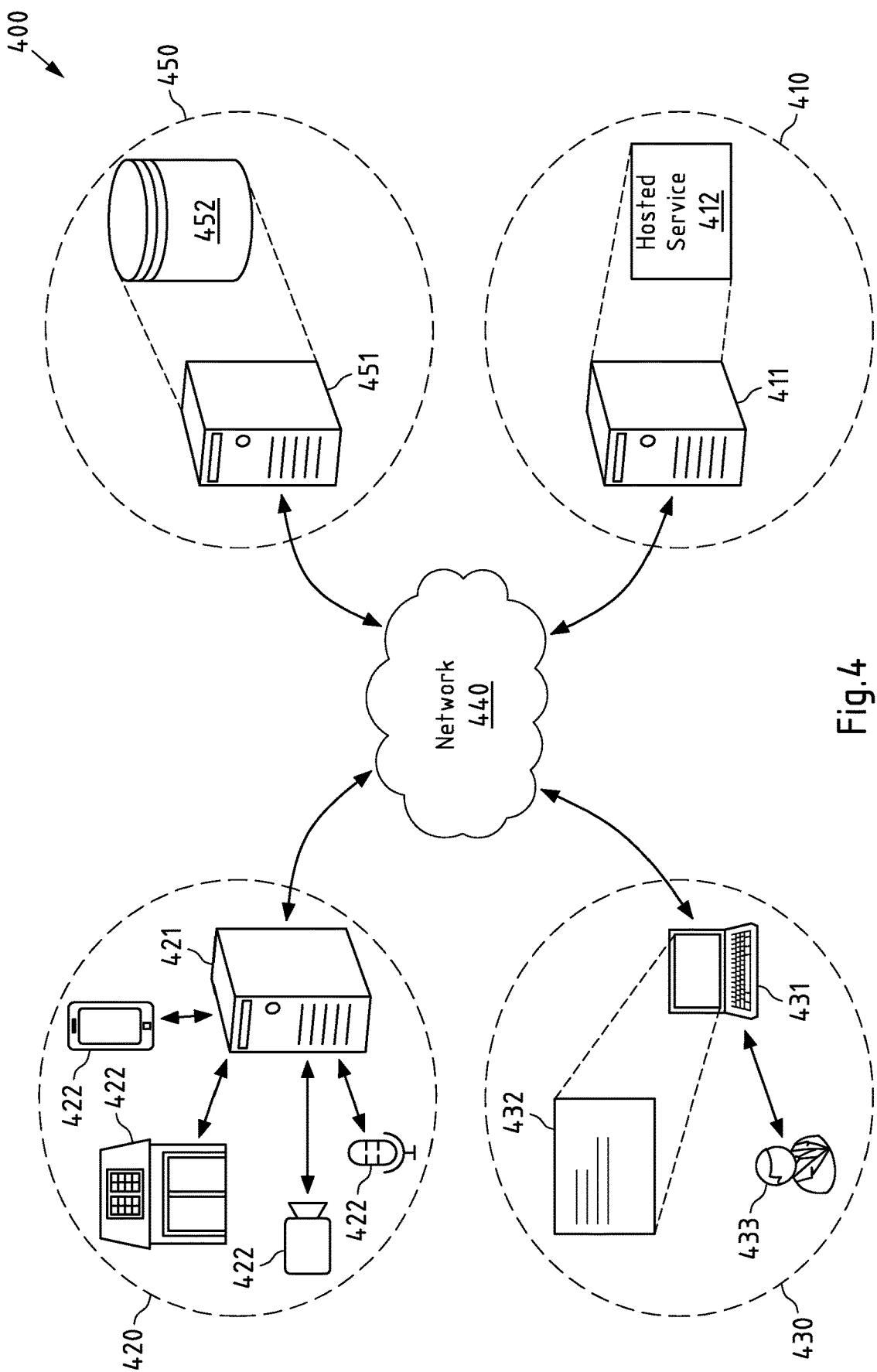
FIG. 4 shows a system according to an exemplary aspect of the present invention.

FIG. 4 shows a system according to an exemplary aspect of the present invention.

The system 400 may for instance be part of an environment for providing one or more pieces of information of a user profile for usage in a personalized service. The system 400 comprises a service layer 410, a data collection layer 420, a user system layer 430, a network 440 and an optional data storage layer 450.

The service layer 410 comprises a server 411 for providing the one or more pieces of information of a user profile as a service. The service is marked by reference numeral 412 as a hosted service of server 411. The server 411 is configured to offer hosted and/or remote services. The service may for instance be requested by a request sent to server 411, e.g. over the network 440. For instance, the request may for instance stem from a third party, e.g. a third party which has obtained one or more pieces of user information, e.g. data collection server 421.

The data collection server 421 is comprised by the data collection layer 420. The data collection layer 420 further comprises one or more data sources 422, from which one or more pieces of (user) information may for instance stem. The data sources 422 may for instance be one or more electronic device (e.g. smartphones, tablet, desktop computer, to name but a few non-limiting examples), one or more stores and/or shopping retailers, one or more devices with one or more sensors, e.g. a camera, and/or a microphone to name but a few non-limiting examples. The data sources 422 may for instance be used for obtaining one or more pieces of information, e.g. by server 421 (see also step 201 of FIG. 2).

The user system layer 430 comprises an electronic device 431 (e.g. a smartphone, tablet, desktop computer to name but a few non-limiting examples) a user 433 can use. The electronic device 431 does not necessarily need to be the electronic device of the user. It may for instance be any electronic device accessible by the user, e.g. at public locations like stations or the like. The electronic device 431 may for instance provide a user interface 432 to the user. For instance, the user may define which one or more pieces of user specific information are allowed to be provided to third parties. The optional data storage layer 450 may for instance store one or more user profiles comprising one or more pieces of personal information and/or one or more pieces of attribute information associated with the user of the user profile. The data storage layer may for instance comprise on or more data silos 452 (see also data silos 151 to 156 of FIG. 1). Server 411 may for instance be configured to establish a communication connection with each of the data silos 452.

Communication between server 411 and data silos 452, and/or between server 451 and server 420 may for instance take place at least partially in a wired function, e.g. based on Local Area Network (LAN), and/or Wide Area Network (WAN) communication. Additionally or alternatively, communication between server 420 and electronic device 431 may for instance take place at least partially wireless function, e.g. based on cellular radio communication or on Wireless Local Area Network (WLAN) based communication, to name but a few non-limiting examples. The communication may for instance be performed via the network 440.

Figure 5:
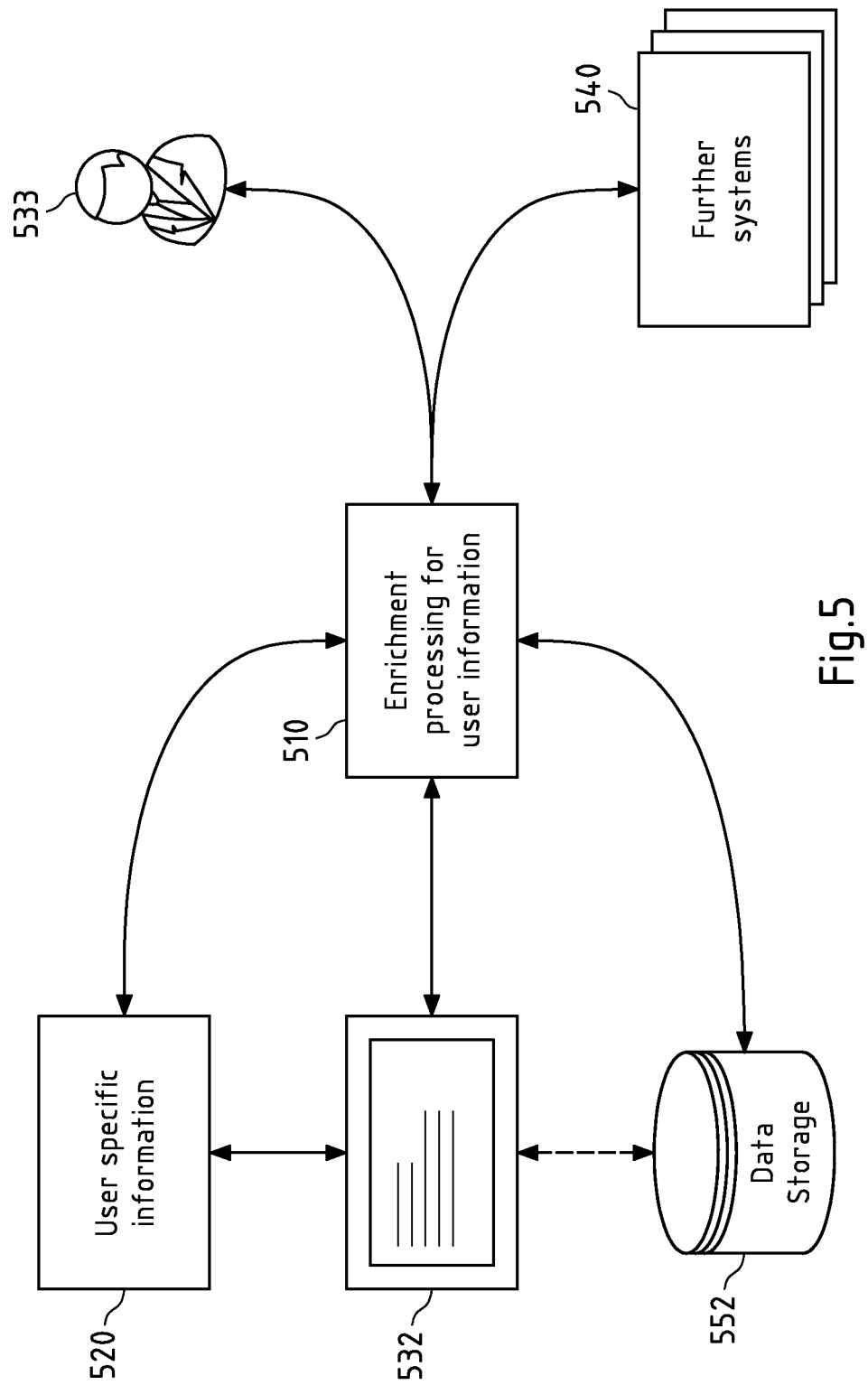
FIG. 5 shows a schematic block diagram of a use case of a system according to an exemplary aspect of the present invention.

FIG. 5 shows a schematic block diagram of a use case of a system according to an exemplary aspect of the present invention.

A user 533 may interact with, analyze, and/or otherwise process and/or distribute one or more pieces of information stored by one or more data silos 552 (see data silos 151 to 156 of FIG. 1) using an enrichment process 510. For example, a user 533 may interact with and/or analyze one or more pieces of user information using a user interface 532 (see user interface 432 of FIG. 4). For instance, a user 552 and/or a group of users may utilize a number of interfaces to collaborate and/or coordinate analysis of available one or more pieces of information. In some embodiments, systems 540 (e.g., automated control systems) may further interact with the enrichment processor for information 208 in connection with analyzing and/or utilizing available one or more pieces of personal information. Additionally or alternatively, this may for instance be performed at least partially automatically by a server, e.g. server 110 of FIG. 1.

In interacting with one or more user profiles, users 533 and/or systems 540 may utilize a variety of functions to add, remove, update, integrate, slice, dice, filter, transform, process, visualize, query, and/or otherwise analyze available one or more pieces of information comprised by the user profile. In some embodiments, such functions may be available to a user 533 via a symbolic representation (e.g., a text, binary, image, etc.) included in the user interface 532. Functions may be performed by the enrichment processor 510, usable by the user 533. In further embodiments, functions may be relayed to other systems (e.g., via the user interface 532) using e.g. a suitable network and/or data protocol and results may be aggregated and/or stored by the data silos 552. Additionally or alternatively, they are received to the users 533 and they are relayed to e.g. the enrichment processor 510. The enrichment processor may for instance be embodied by a server (e.g. server 110 of FIG. 1, or server 411 of FIG. 4).

In an exemplary embodiment, results of performed one or more enrichment processes by enrichment processor 510 using available functions may be in the form of data, code, algorithms, models, statistics, visualizations, and/or the like. The results may for instance be stored as at least a part of the user profile, e.g. in a storage 520. One or more pieces of information of the user profile may be shared and/or discussed between users 533 and/or third parties (e.g. third party server 145 of FIG. 1, server 420 of FIG. 4) using collaborative functionalities associated the user interface 532. For example, work performed using available personal information and/or attribute information derived therefrom may be exchanged synchronously or asynchronously between users 533 and/or systems 540 and/or third parties (e.g. service providers; server 145 of FIG. 1, or server 420 of FIG. 4) during performance of the enrichment process 510 and/or after results are created.

Figure 6:
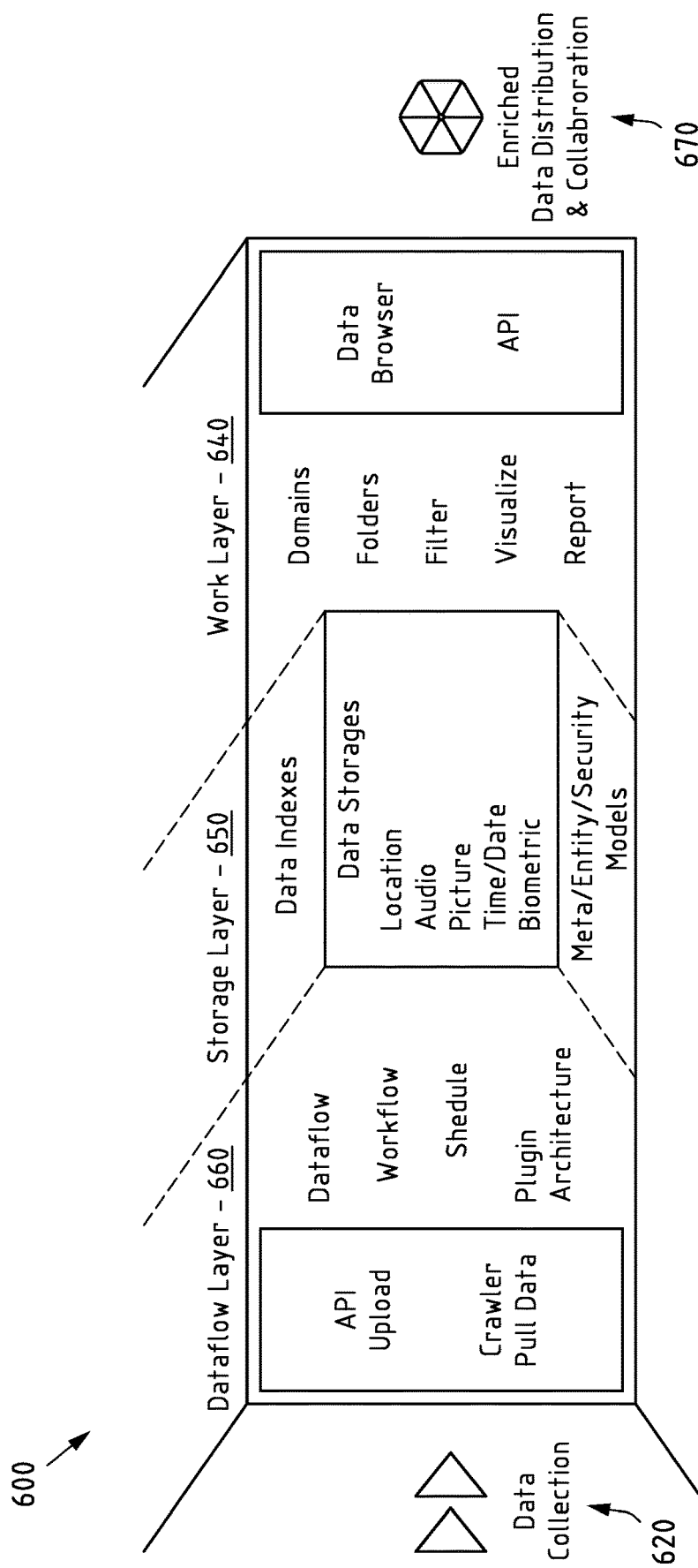
FIG. 6 shows a diagram showing an exemplary flow of information in connection with a system according to an exemplary aspect of the present invention.

FIG. 6 shows a diagram showing an exemplary flow of information in connection with a system according to an exemplary aspect of the present invention.

Particularly, the diagram 600 shows a flow of data in connection with a system or a method according to exemplary aspects of the present invention from data collection 610 to eventual use and distribution of data 670.

After a data collection of different available information e.g. associated with a user and/or a group of users is completed, the obtained one or more pieces of information may for instance be processed by the dataflow layer 660. The one or more pieces of information may for instance be uploaded by an API. Additionally or alternatively, further one or more pieces of information may for instance be gathered by a crawler, which may for instance pull the further one or more pieces of information. The crawling may for instance be performed based on information already being associated with the user and/or the group of users of a user profile. Events (e.g. crawling) of the dataflow layer 660 may be scheduled by a scheduler. For instance, a crawling for new information may be performed to an assigned particular time, date, and/or periodicity. Further, events to be performed may be controlled by a plugin architecture. Such an architecture may for instance allow to obtain one or more pieces of information according to e.g. rules defined by the plugin architecture. Alternatively or additionally, events to be performed may be controlled by predefined workflows, e.g. crawling of predefined sources, which are likely to comprise one or more pieces of user information.

The storage layer 650 may for instance perform storage-related functions related to integrating, processing, and distributing of user information. The data storages may for instance be associated with types of personal information, e.g. location, audio, picture, time/date, and/or biometric related user information, to name but a few non-limiting examples. Alternatively or additionally, meta, entity or security models may be employed. E.g. personal information of a source may be accompanied by meta data, which may for instance be used for determining the type (e.g. attribute) of the user information. Further, it may for instance be considered from which entity the user information stems. For instance, the user information may stem from a camera of an electronic device, or may stem from a public camera to name but a few examples. Additionally or alternatively, a security model may for instance be employed, e.g. describing authentication and/or authorization setup in terms of principals, privileges and/or roles, data access restrictions with other domains, and/or which principals can collect what kind of data into the system.

The work layer 640 may for instance manage the system according to all aspects of the present invention, conduct collaborative analytics by system users, integrate with other instances of the system or other external systems, and/or provide a variety of services in connection with available user specific information. In exemplary embodiments according to all aspects of the present invention, the work layer 640 may offer services that allow for configuration of data collection, data transformations, and/or computations performed by the dataflow layer 660. Further services may for instance comprise management of pieces of information of a user profile. For instance, the pieces of information of the user profile may be filtered, organized in folders (e.g. data of a folder may only be provided to certain third parties), visualized, reported, and/or further domains to be crawled for obtained additional pieces of information may be entered by the user.

The data browser comprised by the work layer 640 may for instance enable a user to browse personal information and/or attribute information associated with him, or may allow to browse user specific information by third parties, e.g. via an API. For instance, the third party may be enabled to search for personal information and/or attribute information of a user and/or a group of users of interest to them to provide the best possible personalized service to the user.

Figure 7:
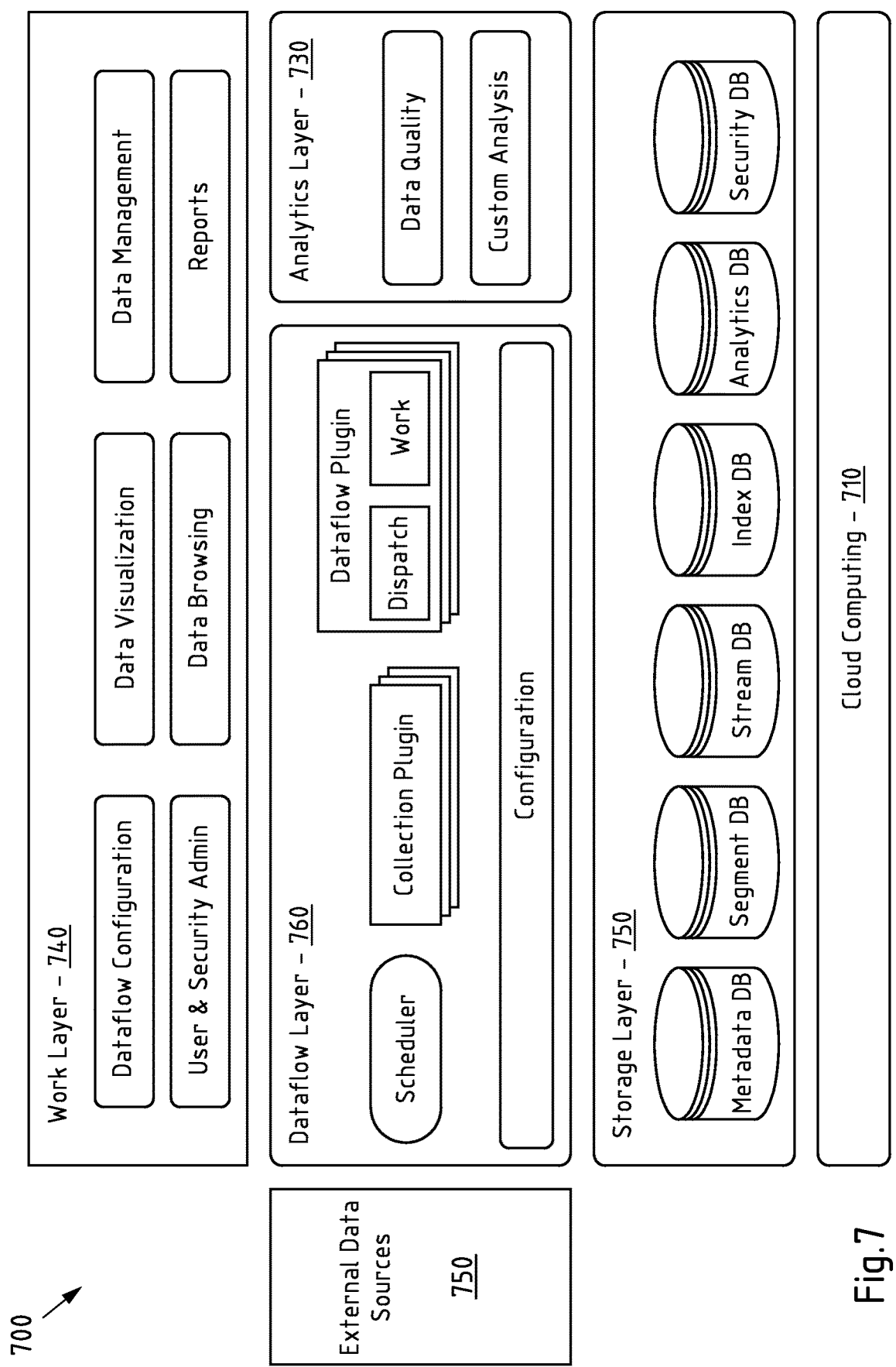
FIG. 7 shows an architecture of a system according to an exemplary aspect of the present invention.

FIG. 7 shows an architecture of a system according to an exemplary aspect of the present invention.

The work layer 740 may for instance comprise software-implemented methods for configuring functions performed by the dataflow layer 760, methods for managing data, methods for administering a user's profile (e.g., identification information associated with a user) and/or security information (e.g., security information relating to authentication of user rights to access certain data), methods for browsing data, methods for generating reports relating to data, and/or the like. Methods provided by the work layer 740 may be utilized in connection with data and/or other information associated with the dataflow layer 760, the storage layer 750, and/or the analytics layer 730.

The dataflow layer 760 may interface with one or more external data silos 750 and user information collected by the data silos 750.

In certain embodiments, data processing steps may be performed by dispatcher component(s), responsible for data flow control, and/or worker component(s), responsible for performing data transformation tasks. An exemplary dispatcher component may contain flow logic to decide when e.g. new user specific information can be enriched (e.g., realizing logical condition and/or barrier logic) with already obtained user specific information.

The storage layer 750 may implement one or more databases, including any of the databases described above. Aspects of the storage layer 750 may be implemented using a cloud computing infrastructure such as, for example, an AWS cloud. In further embodiments, some or all cloud computing infrastructure may be provided by a private cloud and/or a hybrid cloud.

The analytics layer 730 may for instance comprise software-implemented methods for performing data quality and/or other custom analytics processes that may be based on data associated with the dataflow layer 760, e.g. obtained one or more pieces of information, and/or one or more pieces of personal information, and/or one or more pieces of attribute information, the storage layer 750, and/or the analytics layer 730. The analytics layer 730 may for instance perform and/or control detection of unreliable (e.g. not relevant) information, detection of errors and/or outliers in information and/or personal information based e.g. on predefined rules and/or thresholds. For instance, in the case of one or more pieces of information obtained by an electronic device (e.g. electronic device 141 to 145 of FIG. 1, electronic device 431 of FIG. 4) determining unreliabilities of information, based, at least partially on already obtained personal information, e.g. stored by the data silos. The information could be analyzed based on e.g. known attributes of the user or the like to identify, highlight, and/or distribute deviations in expected associations comprised by the information.

The following embodiments shall also be considered to be disclosed:

Embodiment 1

An apparatus comprising at least one processor and at least one memory including computer program code, the at least one memory and the computer program code configured to, with the at least one processor, cause the apparatus to at least perform:

obtaining information based at least partially on a search query information being associated with a user and/or a group of users;

extracting personal information associated with the user and/or the group of users from the obtained information;

creating at least one user profile based at least partially on the extracted personal information;

determining one or more pieces of attribute information for enriching the personal information of the created user profile; and allocating the determined one or more pieces of attribute information to the user profile and/or to personal information comprised by the user profile.

Embodiment 2

The apparatus according to embodiment 1, the at least one memory and the computer program code configured to, with the at least one processor, cause the apparatus further to perform:

providing of one or more information comprised by the user profile.

Embodiment 3

The apparatus according to any of the preceding embodiments, wherein based at least partially on one or more results of the search query information a crawling for the personal information is performed.

Embodiment 4

The apparatus according to any of the preceding embodiments, wherein the created user profile is assigned to the user and/or the group of users.

Embodiment 5

The apparatus according to any of the preceding embodiments, wherein the extracted personal information are stored in a database.

Embodiment 6

The apparatus according to any of the preceding embodiments, wherein one or more pointers to a source comprising the obtained information are comprised by the user profile.

Embodiment 7

The apparatus according to any of the preceding embodiments, the at least one memory and the computer program code configured to, with the at least one processor, cause the apparatus further to perform:

determining relevant information about the user and/or the group of users comprised by the user profile based at least partially on pre-defined or determined according to pre-defined parameters rules.

Embodiment 8

The apparatus according to any of the preceding embodiments, in case the created user profile is associated with more than one user, the at least one memory and the computer program code configured to, with the at least one processor, cause the apparatus further to perform:

creating a user profile for each user of the more than one users, wherein the user profile is created based at least partially on the personal information associated with the user.

Embodiment 9

The apparatus according to any of the preceding embodiments, the at least one memory and the computer program code configured to, with the at least one processor, cause the apparatus further to perform:

determining a quality information and/or quality information of the source the personal information stems based at least partially on an evaluation of the source according to pre-defined rules.

Embodiment 10

The apparatus according to any of the preceding embodiments, wherein one or more importance ranks are assigned to the determined one or more pieces of attribute information of the user profile.

Embodiment 11

The apparatus according to embodiment 10, wherein the one or more importance ranks are generated based at least partially on the following steps:

determining a first rating for one or more sources for each of the pieces of personal information of the user profile;

determining a second rating for the one or more attributes of the user profile;

determining the one or more importance ranks according to (i) authenticity, (ii) preciseness, and/or (iii) up-to-dateness of the personal information of the user profile based at least partially on the determined first rating and the determined second rating.

Embodiment 12

The apparatus according to any of the embodiments 9 to 11, the at least one memory and the computer program code configured to, with the at least one processor, cause the apparatus further to perform:

determining a scoring based at least partially on the quality information and/or the quantity information of the source from which the personal information stems.

Embodiment 13

The apparatus according to embodiments 10 to 12, the at least one memory and the computer program code configured to, with the at least one processor, cause the apparatus further to perform:

providing the one or more importance ranks of a user profile, e.g. out of a plurality of user profiles in case more than one user profile is generated.

Embodiment 14

The apparatus according to any of the preceding embodiments, wherein one or more sources from which the personal information stem are blockable or verifyable.

Embodiment 15.1

The apparatus according to any of the preceding embodiments, wherein based at least partially on a piece of delete information (e.g. entered by the user and/or the group of users and/or at least one user of the group of users) one or more of the following is deleted:
i) information (e.g. at the source);
ii) personal information of the user profile (e.g. at a database);
iii) allocated one or more attributes;
iv) other information obtained (e.g. gathered) and being associated with the user and/or the group of users.

Embodiment 15.2

A method, comprising:
obtaining information based at least partially on a search query information being associated with a user and/or a group of users;
extracting personal information associated with the user and/or the group of users from the obtained information;
creating at least one user profile based at least partially on the extracted personal information;
determining one or more pieces of attribute information for enriching the personal information of the created user profile; and
allocating the determined one or more pieces of attribute information to the user profile and/or to personal information comprised by the user profile.

Embodiment 16

The method according to embodiment 15.2, the method further comprising:
providing of one or more information comprised by the user profile.

Embodiment 17

The method according to any of the preceding embodiments, wherein based at least partially on one or more results of the search query information a crawling for the personal information is performed.

Embodiment 18

The method according to any of the preceding embodiments, wherein the created user profile is assigned to the user and/or the group of users.

Embodiment 19

The method according to any of the preceding embodiments, wherein the extracted personal information are stored in a database.

Embodiment 20

The method according to any of the preceding embodiments, wherein one or more pointers to a source comprising the obtained information are comprised by the user profile.

Embodiment 21

The method according to any of the preceding embodiments, the method further comprising:

determining relevant information about the user and/or the group of users comprised by the user profile based at least partially on pre-defined or determined according to pre-defined parameters rules.

Embodiment 22

The method according to any of the preceding embodiments, in case the created user profile is associated with more than one user, the method further comprising:

creating a user profile for each user of the more than one users, wherein the user profile is created based at least partially on the personal information associated with the user.

Embodiment 23

The method according to any of the preceding embodiments, the method further comprising:

determining a quality information and/or quality information of the source the personal information stems based at least partially on an evaluation of the source according to pre-defined rules.

Embodiment 24

The method according to any of the preceding embodiments, wherein one or more importance ranks are assigned to the determined one or more pieces of attribute information of the user profile.

Embodiment 25

The method according to embodiment 24, wherein the one or more importance ranks are generated based at least partially on the following steps:

determining a first rating for one or more sources for each of the pieces of personal information of the user profile;

determining a second rating for the one or more attributes of the user profile;

determining the one or more importance ranks according to (i) authenticity, (ii) preciseness, and/or (iii) up-to-dateness of the personal information of the user profile based at least partially on the determined first rating and the determined second rating.

Embodiment 26

The method according to any of the embodiments 23 to 25, the method further comprising:

determining a scoring based at least partially on the quality information and/or the quantity information of the source from which the personal information stems.

Embodiment 27

The method according to embodiments 24 to 26, the method further comprising:

providing the one or more importance ranks of a user profile, e.g. out of a plurality of user profiles in case more than one user profile is generated.

Embodiment 28

The method according to any of the preceding embodiments, wherein one or more sources from which the personal information stem are blockable or verifiable.

Embodiment 29

The method according to any of the preceding embodiments, wherein based at least partially on a piece of delete information (e.g. entered by the user and/or the group of users and/or at least one user of the group of users) one or more of the following is deleted:

i) information (e.g. at the source);
ii) personal information of the user profile (e.g. at a database);
iii) allocated one or more attributes;
iv) other information obtained (e.g. gathered) and being associated with the user and/or the group of users.

Embodiment 30

An apparatus configured to perform and/or control or comprising respective means for performing and/or controlling the method of any of the embodiments 15.2 to 29.

Embodiment 31

An apparatus comprising at least one processor and at least one memory including computer program code, the at least one memory and the computer program code configured to, with the at least one processor, cause an apparatus at least to perform and/or control the method of any of the embodiments 15.2 to 29.

Embodiment 32

A system, comprising one or more apparatuses configured to perform and/or control the method according to any of the embodiments 15.2 to 29.

Further, the following embodiment shall also be considered to be disclosed:

To better understand what the infrastructure and the ranking described above can enable, it is explained in the following an exemplary use case that is enabled by the infrastructure and that it unique itself.

A method and/or mean to search for and/or display results based on information in the web or any other database or dataset after enriching the search algorithm's with human insights and/or attributes to validate search results and to increase quality of search results. The multi dimension search introduced is based on a multistep approach, with a first non-insightful search follow by a second (n+1) insightful search to perform queries of the content in order to produce a human-centric result. The method involves receiving first search criteria from a user, searching the Internet or any other dataset, offering the first results to perform the human validation for any following search in the Internet or any other dataset. The method also enriches the search with other available attributes insights available on the user through other databases to produce human-centric results.

A search in general is triggered by human input on the text-box, or today audio input, later most likely other ways of input with a search query, most likely a word or a series of words without any additional input. Build on top of the infrastructure, e.g. based on which the method according to the first aspect of the present invention may for instance be performed and/or controlled, however, the individual can be identified and attributes connected to him can be provided in addition to the triggering input. That way the search input is enriched by the contextual frame. This will than lead to different initial search results after a first search (1. Quality boost—high quality results). Now the user can see the results and choose the result based on the content of the summary provided that fits best to his search needs. Clicking this result will initialize a second search, taking into consideration the individual, the attributes connected to him (so the context) and the input from the chosen result to search the web for the best results, presenting them right after (first feedback loop). This will lead to an increasing quality of overall search results.

Further, instant search may for instance be used, so instead of the result based on ranking by usage or other form, actuality would also be included. Therefore information provided, e.g. by the usage of the infrastructure, e.g. based on which the method according to the first aspect of the present invention may for instance be performed and/or controlled, could be used. For instance, the geo-information (location) provided by a third party application (e.g. as a service of a service provider) could enable totally different search results. Is the user on a certain highway, e.g. highway 101 in California and triggers a search event (e.g. via audio input and/or text-box input) which only includes for instance "101", traffic information could be provided about the traffic situation in front of him. Same for any other use case, for instance shopping, sales of today near his location (or maybe even his wife's location) to name but one additional and non-limiting example.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. An apparatus comprising at least one processor and at least one memory including computer program code, the at least one memory and the computer program code configured to, with the at least one processor, cause the apparatus to at least perform:
   obtaining information based at least partially on a search query information being associated with a user and/or a group of users;
   extracting personal information associated with the user and/or the group of users from the obtained information;
   creating at least one user profile based at least partially on the extracted personal information;
   determining one or more pieces of attribute information for enriching the personal information of the created user profile;
   allocating the determined one or more pieces of attribute information to the user profile and/or to personal information comprised by the user profile,
      wherein one or more pointers to a source comprising the obtained information are comprised by the user profile; and
   providing of one or more information comprised by the user profile to a server of a third party service provider that requested to be provided with one or more pieces of personal information associated with the user for providing a personalized service to the user.

2. The apparatus according to claim 1, wherein based at least partially on one or more results of the search query information a crawling for the personal information is performed.

3. The apparatus according to claim 1, wherein the created user profile is assigned to the user and/or the group of users.

4. The apparatus according to claim 1, the at least one memory and the computer program code configured to, with the at least one processor, cause the apparatus further to perform:
  determining relevant information about the user and/or the group of users comprised by the user profile based at least partially on pre-defined or determined according to pre-defined parameters rules.

5. The apparatus according to claim 1, in case the created user profile is associated with more than one user, the at least one memory and the computer program code configured to, with the at least one processor, cause the apparatus further to perform:
  creating a user profile for each user of the more than one users, wherein the user profile is created based at least partially on the personal information associated with the user.

6. The apparatus according to claim 1, the at least one memory and the computer program code configured to, with the at least one processor, cause the apparatus further to perform:
  determining a quality information and/or quantity information of the source the personal information stems based at least partially on an evaluation of the source according to pre-defined rules.

7. The apparatus according to claim 6, the at least one memory and the computer program code configured to, with the at least one processor, cause the apparatus further to perform:
  determining a scoring based at least partially on the quality information and/or the quantity information of the source from which the personal information stems.

8. The apparatus according to claim 1, wherein one or more importance ranks are assigned to the determined one or more pieces of attribute information of the user profile.

9. An apparatus comprising at least one processor and at least one memory including computer program code, the at least one memory and the computer program code configured to, with the at least one processor, cause the apparatus to at least perform:
  obtaining information based at least partially on a search query information being associated with a user and/or a group of users;
  extracting personal information associated with the user and/or the group of users from the obtained information;
  creating at least one user profile based at least partially on the extracted personal information;
  determining one or more pieces of attribute information for enriching the personal information of the created user profile; and
  allocating the determined one or more pieces of attribute information to the user profile and/or to personal information comprised by the user profile, wherein one or more pointers to a source comprising the obtained information are comprised by the user profile, wherein the source of obtained information is a third party service provider,
    wherein one or more importance ranks are assigned to the determined one or more pieces of attribute information of the user profile, and
    wherein the one or more importance ranks are generated based at least partially on the following steps:
  determining a first rating for one or more sources for each of the pieces of personal information of the user profile;
  determining a second rating for the one or more attributes of the user profile;
  determining the one or more importance ranks according to (i) authenticity, (ii) preciseness, and/or (iii) up-to-dateness of the personal information of the user profile based at least partially on the determined first rating and the determined second rating.

10. A method, comprising:
  obtaining information based at least partially on a search query information being associated with a user and/or a group of users;
  extracting personal information associated with the user and/or the group of users from the obtained information;
  creating at least one user profile based at least partially on the extracted personal information;
  determining one or more pieces of attribute information for enriching the personal information of the created user profile;
  allocating the determined one or more pieces of attribute information to the user profile and/or to personal information comprised by the user profile,
    wherein one or more pointers to a source comprising the obtained information are comprised by the user profile; and
  providing of one or more information comprised by the user profile to a server of a third party service provider that requested to be provided with one or more pieces of personal information associated with the user for providing a personalized service to the user.

11. The method according to claim 10, wherein based at least partially on one or more results of the search query information a crawling for the personal information is performed.

12. The method according to claim 10, wherein the created user profile is assigned to the user and/or the group of users.

13. The method according to claim 10, the method further comprising:
  determining relevant information about the user and/or the group of users comprised by the user profile based at least partially on pre-defined or determined according to pre-defined parameters rules.

14. The method according to claim 10, in case the created user profile is associated with more than one user, the method further comprising:
  creating a user profile for each user of the more than one users, wherein the user profile is created based at least partially on the personal information associated with the user.

15. The method according to claim 10, the method further comprising:
  determining a quality information and/or quantity information of the source the personal information stems based at least partially on an evaluation of the source according to pre-defined rules.

16. The method according to claim 10, wherein one or more importance ranks are assigned to the determined one or more pieces of attribute information of the user profile.

17. A method, comprising:
  obtaining information based at least partially on a search query information being associated with a user and/or a group of users;
  extracting personal information associated with the user and/or the group of users from the obtained information;
  creating at least one user profile based at least partially on the extracted personal information;

determining one or more pieces of attribute information for enriching the personal information of the created user profile; and allocating the determined one or more pieces of attribute information to the user profile and/or to personal information comprised by the user profile, wherein one or more pointers to a source comprising the obtained information are comprised by the user profile, wherein the source of obtained information is a third party service provider, wherein one or more importance ranks are assigned to the determined one or more pieces of attribute information of the user profile, and wherein the one or more importance ranks are generated based at least partially on the following steps:

determining a first rating for one or more sources for each of the pieces of personal information of the user profile;

determining a second rating for the one or more attributes of the user profile;

determining the one or more importance ranks according to (i) authenticity, (ii) preciseness, and/or (iii) up-to-dateness of the personal information of the user profile based at least partially on the determined first rating and the determined second rating.

18. A tangible non-transitory computer-readable medium storing computer program code, the computer program code when executed by a processor causing an apparatus to perform and/or control:

obtaining information based at least partially on a search query information being associated with a user and/or a group of users;

extracting personal information associated with the user and/or the group of users from the obtained information;

creating at least one user profile based at least partially on the extracted personal information;

determining one or more pieces of attribute information for enriching the personal information of the created user profile;

allocating the determined one or more pieces of attribute information to the user profile and/or to personal information comprised by the user profile, wherein one or more pointers to a source comprising the obtained information are comprised by the user profile; and providing of one or more information comprised by the user profile to a server of a third party service provider that requested to be provided with one or more pieces of personal information associated with the user for providing a personalized service to the user.

* * * * *